(12) United States Patent
Ono et al.

(10) Patent No.: US 8,757,362 B2
(45) Date of Patent: Jun. 24, 2014

(54) CONVEYOR SYSTEM

(75) Inventors: Akio Ono, Okazaki (JP); Mitsuhiro Harada, Toyota (JP); Taiki Murao, Toyota (JP)

(73) Assignees: Toyota Jidosha Kabushiki Kaisha, Toyota-shi (JP); Shinmei Industry Co., Ltd., Aichi (JP)

( * ) Notice: Subject to any disclaimer, the term of this patent is extended or adjusted under 35 U.S.C. 154(b) by 0 days.

(21) Appl. No.: 13/820,344

(22) PCT Filed: Sep. 1, 2011

(86) PCT No.: PCT/IB2011/002006
§ 371 (c)(1),
(2), (4) Date: Mar. 1, 2013

(87) PCT Pub. No.: WO2012/028939
PCT Pub. Date: Mar. 8, 2012

(65) Prior Publication Data
US 2013/0161156 A1   Jun. 27, 2013

(30) Foreign Application Priority Data
Sep. 3, 2010 (JP) ................. 2010-198391

(51) Int. Cl.
*B65G 25/10* (2006.01)
*B65G 35/08* (2006.01)
*B65G 35/06* (2006.01)

(52) U.S. Cl.
CPC ............... *B65G 25/10* (2013.01); *B65G 35/08* (2013.01); *B65G 35/06* (2013.01)
USPC ... 198/737; 198/747; 198/468.9; 198/468.11; 198/465.1

(58) Field of Classification Search
CPC ........ B65G 25/10; B65G 25/08; B65G 35/08; B65G 35/06
USPC ........................ 198/465.1, 468.9, 468.11, 747
See application file for complete search history.

(56) References Cited

U.S. PATENT DOCUMENTS 3,767,064 A * 10/1973 Lutz ............................... 198/772
3,786,911 A * 1/1974 Milazzo ........................ 198/718

(Continued)

FOREIGN PATENT DOCUMENTS

| JP | 62 123849 | 8/1987 |
| JP | 63 22422 | 1/1988 |
| JP | 63 119526 | 8/1988 |
| JP | 3 293207 | 12/1991 |

(Continued)

OTHER PUBLICATIONS

Japanese Office Action Issued Jul. 13, 2012 in JP Patent Application 2010-198391, filed Sep. 3, 2010 (partial English translation only).

*Primary Examiner* — Mark A Deuble
(74) *Attorney, Agent, or Firm* — Oblon, Spivak, McClelland, Maier & Neustadt, L.L.P.

(57) ABSTRACT

A conveyor system that transports a plurality of pallets includes: at least two driving devices that each have an engaging portion to be engaged with the pallet located at an upstream-side end portion in a pallet transport direction and that moves the engaging portion in a state where the engaging portion is engaged with the pallet to thereby simultaneously push the plurality of pallets; and a transport portion on which the plurality of pallets are mounted and that is able to transport the plurality of pallets pushed by the driving devices. The conveyor system is configured to transport the plurality of pallets at a constant speed by engaging the engaging portion of one of the driving devices with the pallet and causing the one of the driving devices to start pushing the plurality of pallets by the time when another one of the driving devices completes pushing the plurality of pallets.

7 Claims, 10 Drawing Sheets

(56) References Cited

U.S. PATENT DOCUMENTS

| | | | |
|---|---|---|---|
| 5,042,392 A * | 8/1991 | Brethorst | 104/162 |
| 5,320,213 A * | 6/1994 | McIntosh et al. | 198/744 |
| 7,219,785 B2 * | 5/2007 | Saito et al. | 198/345.1 |
| 7,588,239 B2 * | 9/2009 | Marcinik et al. | 270/52.18 |

FOREIGN PATENT DOCUMENTS

| | | |
|---|---|---|
| JP | 5 37435 | 5/1993 |
| JP | 2007 204175 | 8/2007 |
| JP | 2009 166936 | 7/2009 |

* cited by examiner

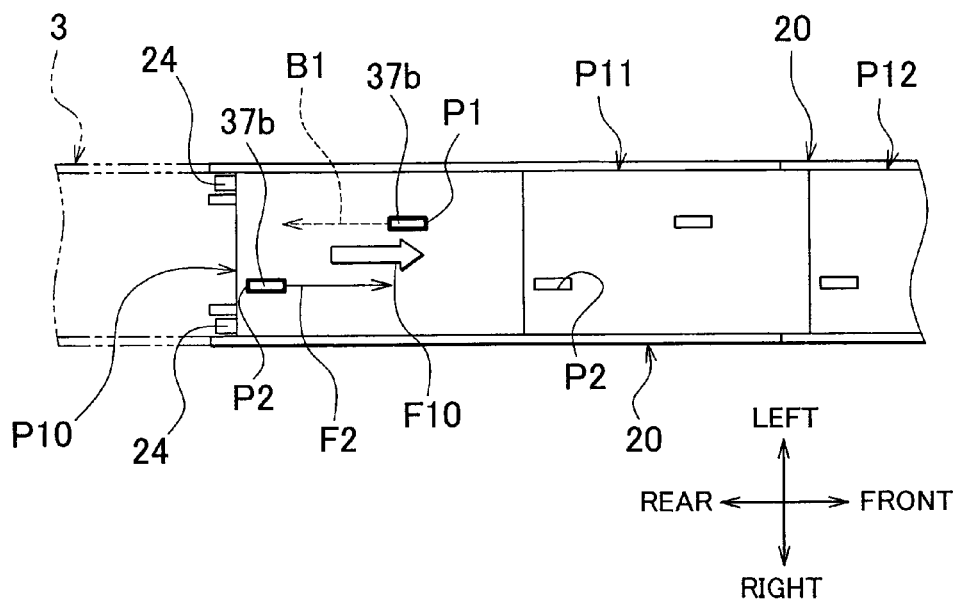
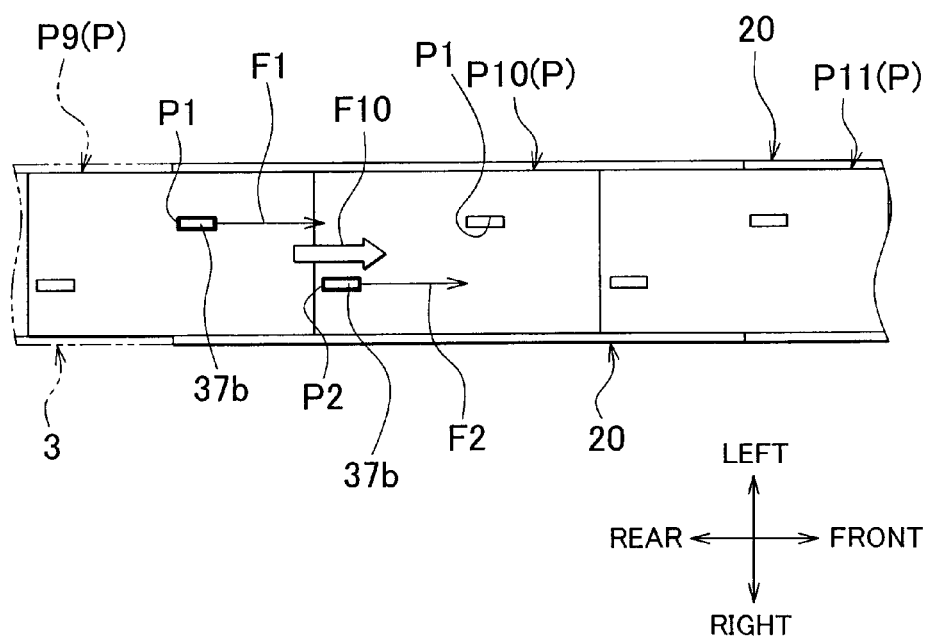

US 8,757,362 B2

CONVEYOR SYSTEM

BACKGROUND OF THE INVENTION

1. Field of the Invention

The invention relates to a conveyor system that transports a plurality of pallets.

2. Description of Related Art

A conveyor system that transports a pallet on which a work piece is mounted is, for example, described in Japanese Patent Application Publication No. 2009-166936 (JP-A-2009-166936).

The technique described in JP-A-2009-166936 is used to transport a pallet on which a work piece is mounted. The conveyor system described in JP-A-2009-166936 includes a direct drive feed mechanism, pins that are moved by the direct drive feed mechanism, an engaging/disengaging mechanism that engages the pins with or disengages the pins from the pallet, and the like.

With the above conveyor system, the pallet may be transported in such a manner that the pins are moved by the direct drive feed mechanism toward the downstream side in a pallet transport direction in a state where the pins are engaged with the pallet. After the pins move toward the downstream side in the transport direction with the pins engaged with the pallet to transport the pallet, the pins disengage from the pallet and move toward the upstream side in the transport direction, and then engage with a pallet again and move toward the downstream side in the transport direction to transport the pallet. In this way, the pins are reciprocally moved in the transport direction while the pins are engaged with or disengaged from a pallet to thereby intermittently transport a pallet. However, the technique described in JP-A-2009-166936 is configured so that the pair of pins are reciprocally moved in the pallet transport direction to intermittently transport a pallet, so that the technique cannot be used in a system that transports a pallet at a constant speed (for example, an engine assembly line, or the like). In addition, when the length of the conveyor system is changed, it is necessary to adapt the direct drive feed mechanism, the engaging/disengaging mechanism, etc. to the changed length. Thus, man-hours required to change the length increase.

The conveyor system that is configured to transport a pallet at a constant speed is, for example, a conveyor system 110 that includes drive transmitting portions 130, each of which transmits the power of a corresponding one of motors 120, as shown in FIG. 9A and FIG. 9B. The conveyor system 110 is configured so that a plurality of transport mechanisms are arranged in the transport direction, and the motor 120 and the drive transmitting portion 130 are provided for each transport mechanism. A rotary shaft of each motor 120 is coupled to corresponding rollers 140 via gears 131 of the drive transmitting portion 130, a shaft 132, etc. The rollers 140 are driven by the corresponding motor 120 in each transport mechanism. In this way, the motors 120 and the drive transmitting portions 130, provided for each transport mechanism, are arranged along the length of the conveyor system 110, as shown in FIG. 10.

When the length of the thus configured conveyor system 110 is changed, work for wiring power lines 122 that transmit power to the respective motors 120, work for adjusting the drive transmitting portions 130, etc. are required. Thus, man-hours required to change the length of the conveyor system 110 increase. In addition, the power of each motor 120 is transmitted to the corresponding rollers 140 via many gears 131, etc., so that a power loss occurs during transmission of power. Thus, a high-power motor is employed in consideration of the power loss is required.

SUMMARY OF THE INVENTION

The invention provides a conveyor system that makes it possible to easily change the length thereof and that is able to transport a plurality of pallets at a constant speed with a low power.

An aspect of the invention provides a conveyor system that transports a plurality of pallets that are closely placed on a transport path. The conveyor system includes: at least two driving devices that each has an engaging portion to be engaged with, of the plurality of pallets, the pallet located at an upstream-side end portion in a pallet transport direction, and that each moves the engaging portion toward a downstream side in the pallet transport direction in a state where the engaging portion is engaged with the pallet located at the upstream-side end portion to thereby simultaneously push the plurality of pallets; and a transport portion on which the plurality of pallets are mounted and that is able to transport the plurality of pallets pushed by the driving devices, wherein the conveyor system is configured to transport the plurality of pallets at a constant speed by repeating engaging the engaging portion of one of the driving devices with the pallet located at the upstream-side end portion in the pallet transport direction and causing the one of the driving devices to start pushing the plurality of pallets by the time when another one of the driving devices completes pushing the plurality of pallets.

In the above aspect, each of the plurality of pallets may have an engaged portion that engages with one of the engaging portions of the driving devices; each driving device may include: an actuator having a rod that extends and retracts along the pallet transport direction; and the engaging portion of each driving device may include an anti-back pawl that is coupled to the rod so as to be immovable relative to each other, that engages with the engaged portion of the pallet and moves together with the pallet toward the downstream side in the pallet transport direction when the anti-back pawl moves toward the downstream side in the pallet transport direction, and that moves toward the upstream side in the pallet transport direction relative to the pallet when the anti-back pawl moves toward the upstream side in the pallet transport direction.

In the above aspect, each actuator may retract the rod to push the pallets.

In the above aspect, the engaged portions may include a first engaged portion and a second engaged portion, and the first engaged portion and the second engaged portion may be offset from each other in the pallet transport direction and in a direction perpendicular to the pallet transport direction.

In the above aspect, the first engaged portions and the second engaged portions may be arranged so that, when the plurality of pallets are aligned along the pallet transport direction so that the adjacent pallets are in contact with each other, the first engaged portions are aligned in a straight line at a constant pitch, the second engaged portions are aligned in another straight line at the constant pitch, and the first engaged portions and the second engaged portions are alternately arranged at equal intervals in the pallet transport direction.

In the above aspect, the plurality of pallets each may have the first engaged portion and the second engaged portion.

In the above aspect, the at least two driving devices may be arranged below the transport portion and inside the transport portion in a horizontal direction perpendicular to the pallet transport direction.

According to the invention, it is possible to easily change the length by adding or removing the transport portion, and it is possible to transport pallets with a small power because the weight of a transported product is not exerted on the driving devices.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7A is a plan view that shows a state where the right-side drive mechanism transports pallets and shows a state where the left-side drive mechanism completes pressing the pallets;

FIG. 7B is a plan view that shows a state where the right-side drive mechanism transports pallets and shows a state where the right-side drive mechanism and the left-side drive mechanism overlappingly push the pallets;

DETAILED DESCRIPTION OF EMBODIMENTS

Hereinafter, a conveyor system 10 that is an embodiment of the conveyor system according to an aspect of the invention will be described with reference to the accompanying drawings.

The conveyor system 10 transports a plurality of pallets P (and a plurality of work pieces W respectively mounted on the pallets P) at a constant speed.

Figure 2:
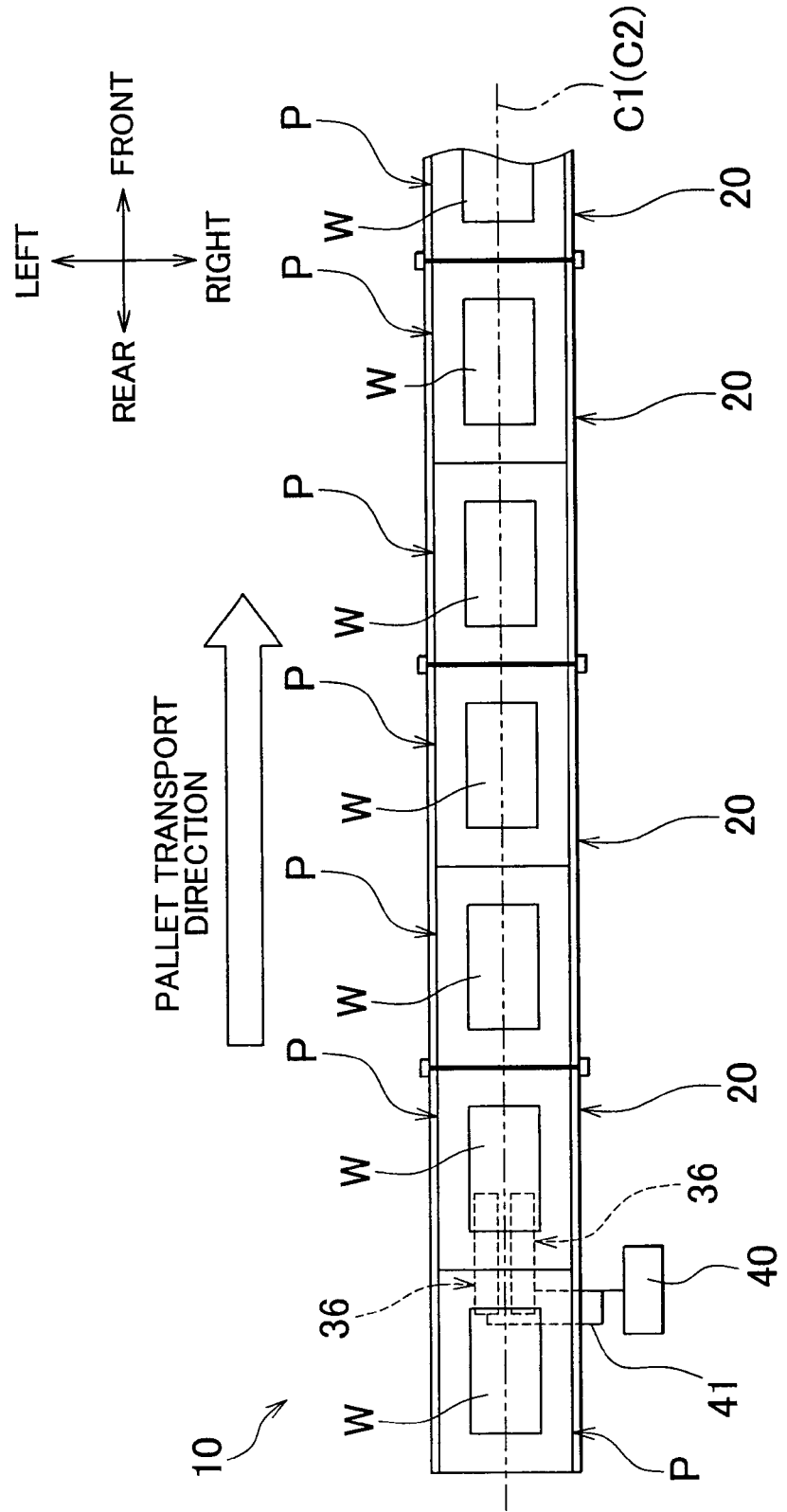
FIG. 2 is a plan view that shows the conveyor system in which a plurality of transport mechanisms are coupled in series.
Figure 3:
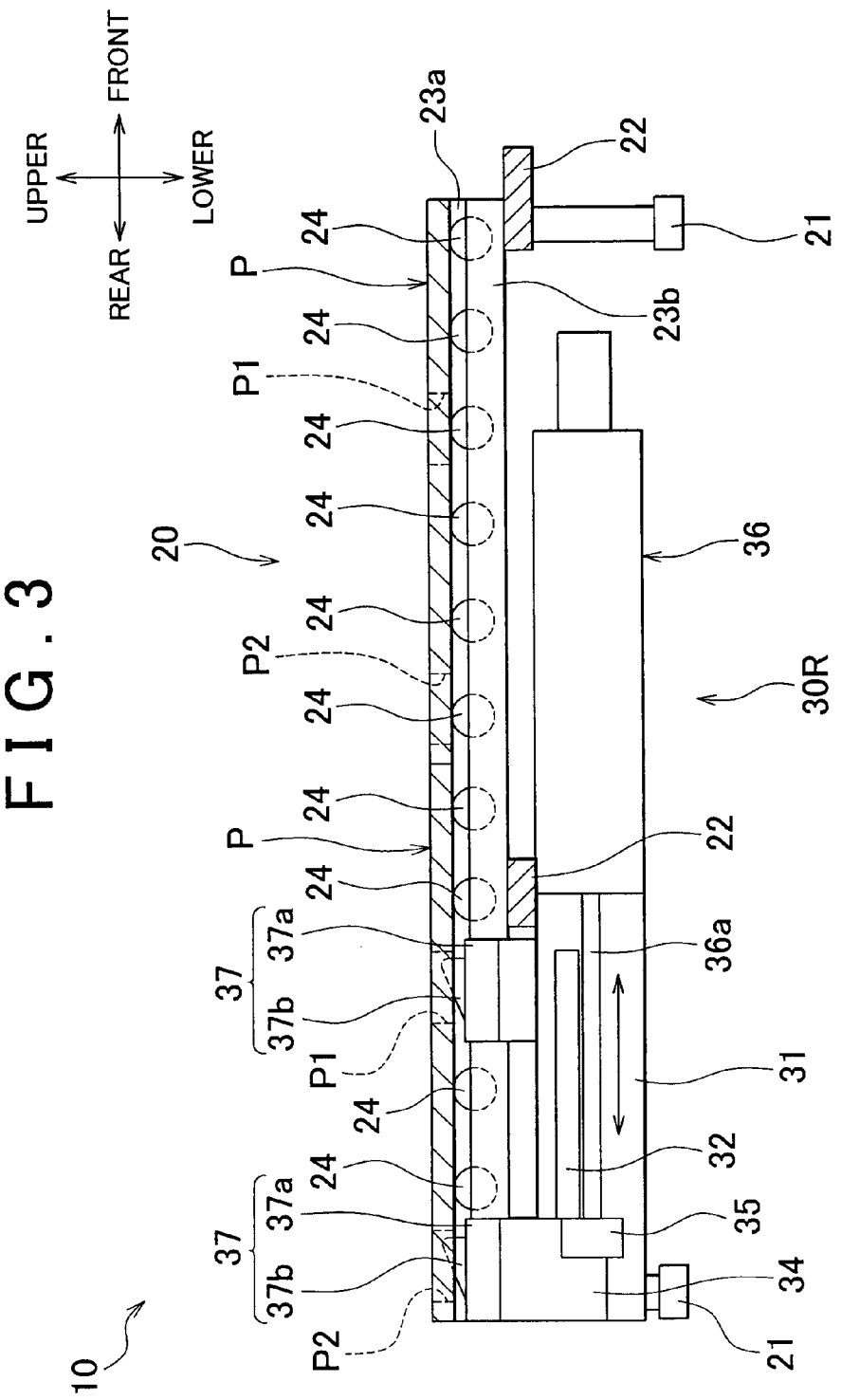
FIG. 3 is a side cross-sectional view that shows drive mechanisms and one of the transport mechanisms.
Figure 4:
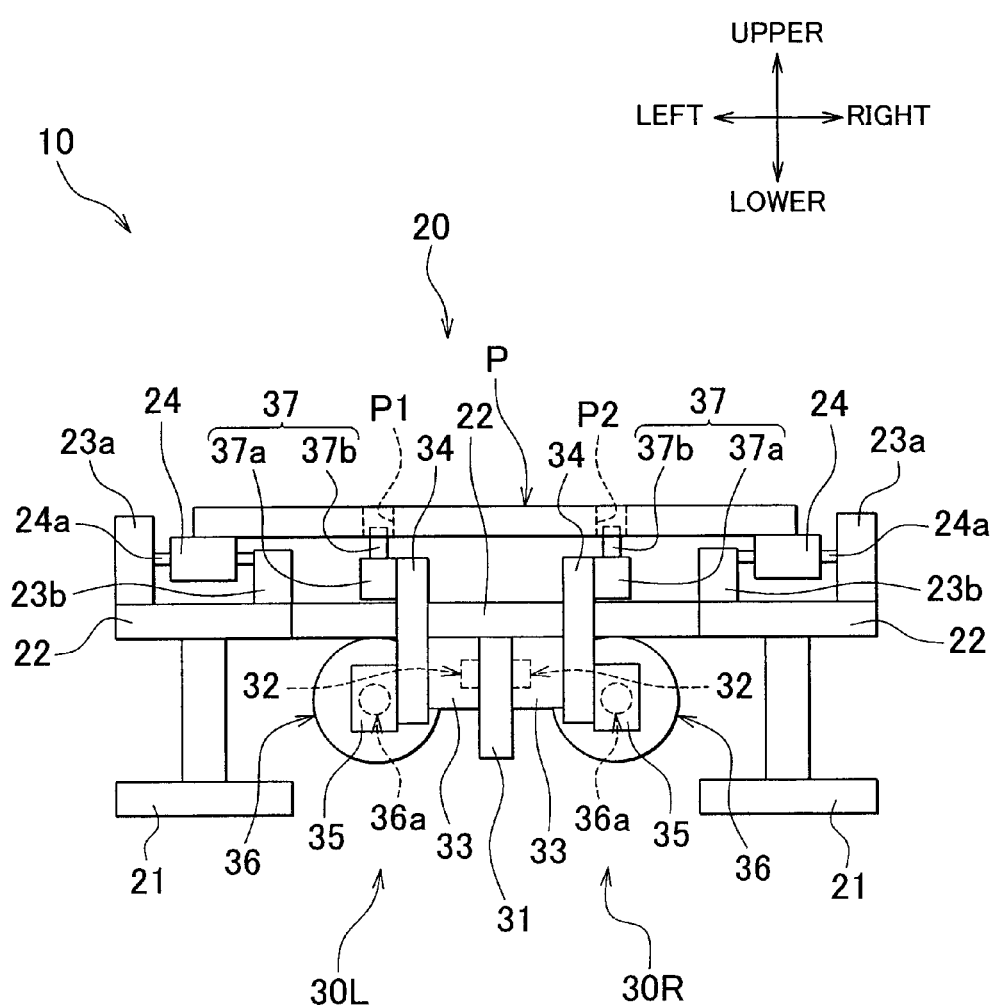
FIG. 4 is a rear view that shows the drive mechanisms and one of the transport mechanisms.

Note that, in the following description, for the sake of convenience of description, the vertical direction in FIG. 3 is defined as the "vertical direction of the conveyor system 10", and the horizontal direction in FIG. 4 is defined as the "transverse direction of the conveyor system 10". In addition, the "front-rear direction of the conveyor system 10" is defined so that the right side in FIG. 2 is set as the front side. As shown in FIG. 2, the conveyor system 10 transports pallets P toward the front side. That is, in the present embodiment, a pallet transport direction (hereinafter, simply referred to as "transport direction") is the direction the same as the direction of the front side.

Figure 8A:
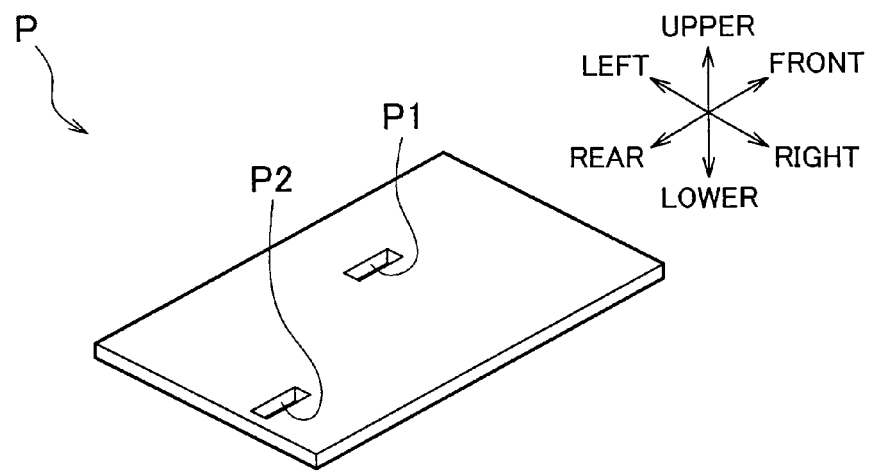
FIG. 8A is a perspective view that shows a pallet.

First, each pallet P will be described. As shown in FIG. 8A, the pallet P is a substantially plate-like member of which the longitudinal direction is set in the front-rear direction, and a work piece W is mounted on the upper surface of the pallet P. The pallet P has a front engaging hole P1 and a rear engaging hole P2.

Figure 8B:
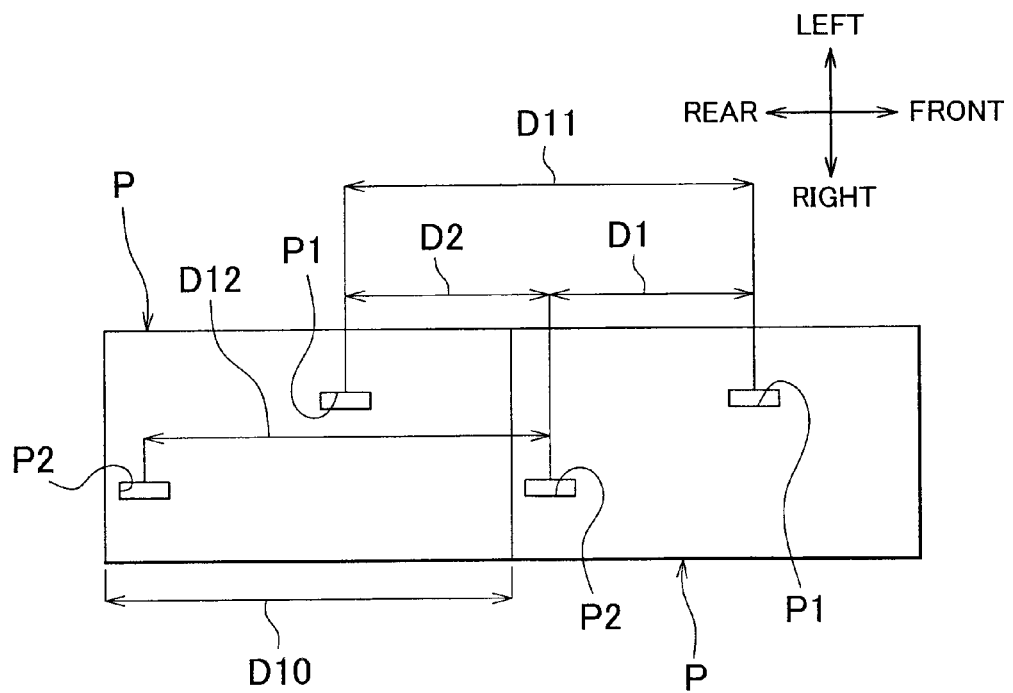
FIG. 8B is a plan view of arranged pallets.

The front engaging hole P1 is formed at the left-side front-rear middle portion of the pallet P, and extends through the plate of the pallet P in the vertical direction. As shown in FIG. 8B, the front engaging hole P1 is formed in a substantially rectangular shape in plan view. The rear engaging hole P2 is formed similarly to the front engaging hole P1 except that the rear engaging hole P2 is formed at the right-side rear end portion of the pallet P. That is, the front engaging hole P1 is arranged forward and leftward with respect to the rear engaging hole P2.

When a plurality of (two in FIG. 8B) pallets P are arranged adjacent to each other in the front-rear direction, the interval in the longitudinal direction between the adjacent engaging holes P1 and P2 (hereinafter, referred to as "pitch of the engaging holes") is equal.

More specifically, the pitch D1 between the engaging holes P1 and P2 of one pallet P is equal to the pitch D2 between the engaging holes P1 and P2 of the adjacent pallets P.

In addition, the pitch D11 between the front engaging holes P1 of the adjacent pallets P and the pitch D12 between the rear engaging holes P2 of the adjacent pallets P are equal to the length D10 of the pallet P in the longitudinal direction. The pitch D1 between the engaging holes P1 and P2 of one pallet P and the pitch D2 between the engaging holes P1 and P2 of the adjacent pallets P are half the length D10 of the pallet P in the longitudinal direction.

Figure 1:
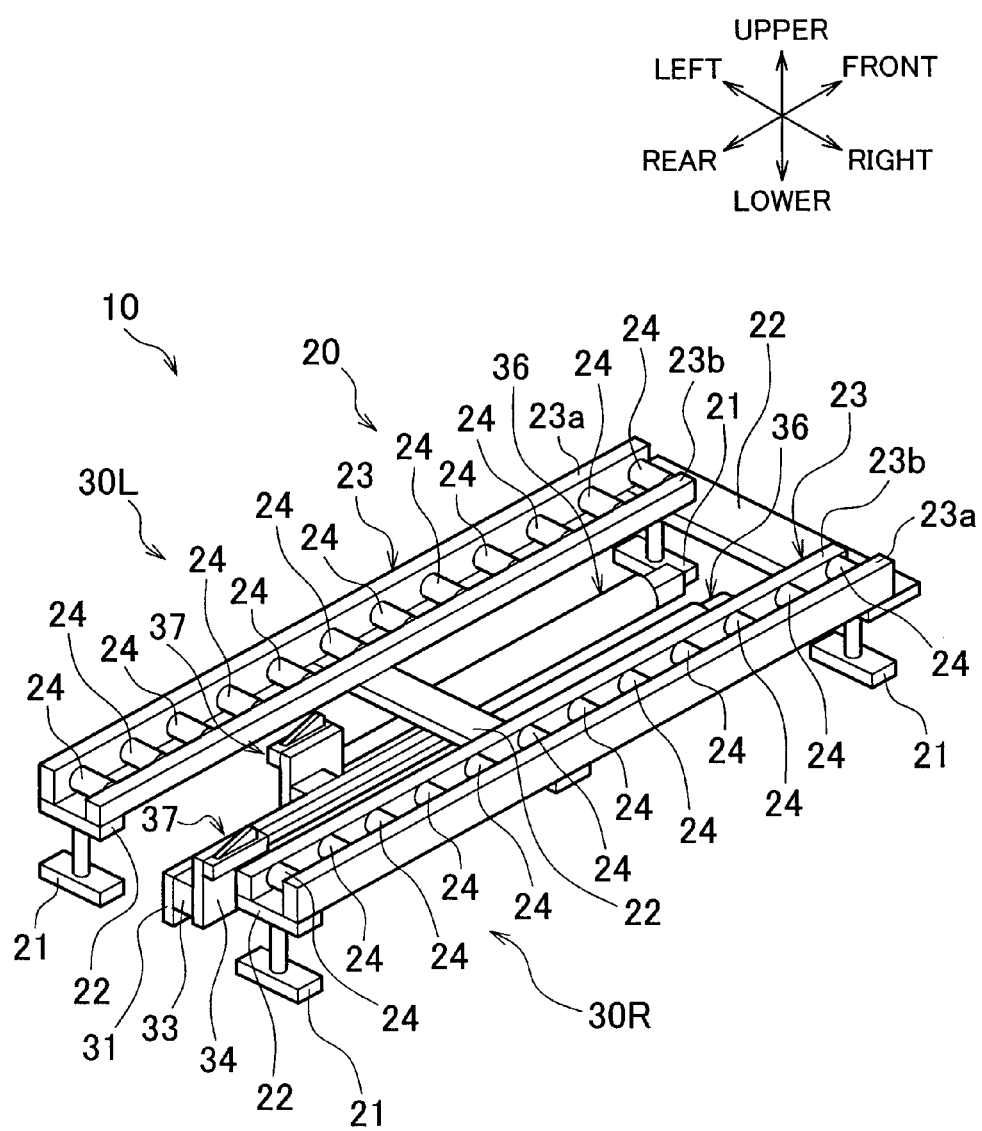
FIG. 1 is a perspective view that shows an overall configuration of a conveyor system.

Next, a configuration of the conveyor system 10 will be described. As shown in FIG. 1 and FIG. 2, the conveyor system 10 includes a plurality of transport mechanisms 20 and a pair of drive mechanisms 30R and 30L.

The plurality of transport mechanisms 20 each are used to transport pallets P. Each transport mechanism 20 includes leg members 21, transverse frames 22, support members 23, and a plurality of rollers 24. The transport mechanisms 20 are coupled in series via bolts or the like, in the transport direction. The pair of drive mechanisms 30R and 30L are provided for the transport mechanism 20 that is located at the upstream-side end portion in the transport direction, and the pair of drive mechanisms 30R and 30L are not provided for the other transport mechanisms 20.

Note that the transport mechanisms 20 all have the same configuration except that the transport mechanism 20 located at the upstream-side end portion in the transport direction supports the pair of drive mechanisms 30R and 30L. Therefore, only the transport mechanism 20 located at the upstream-side end portion in the transport direction shown in FIG. 1 will be described.

As shown in FIG. 3 and FIG. 4, the leg members 21 are respectively provided at the front, rear, right, and left end portions of the transport mechanism 20 at predetermined intervals, and support the transverse frames 22 at a predetermined vertical position. The pair of drive mechanisms 30R and 30L are arranged inside the leg members 21.

Each transverse frame 22 is a substantially plate-like member of which the longitudinal direction is the transverse direction, and couples the leg members 21 to the support members 23 and couples the right and left support members 23 to each other.

As shown in FIG. 1, the transverse frame 22 at the front end portion and the transverse frame 22 at the front-rear middle portion each extend to both right and left end portions of the transport mechanism 20, and couple the support members 23 to each other. The transverse frames 22 at the rear end portion each extend by the width of each support member 23 in the transverse direction so as to allow anti-back pawls 37 (described later) of the respective drive mechanisms 30R and 30L to move (so as not to interfere with the anti-back pawls 37 that moves in the front-rear direction). The transverse frames 22 at the rear end portion respectively couple the rear-side leg members 21 to the corresponding support members 23.

Each support member 23 has an outer portion 23a and an inner portion 23b that are two plate-like members having different lengths in the vertical direction. The support members 23 are respectively provided at both right and left end portions of the transport mechanism 20. As shown in FIG. 3 and FIG. 4, the height of the outer portion 23a is greater than the height of the inner portion 23b. The outer portions 23a are supported by the transverse frames 22. The longitudinal direction of each outer portion 23a is set in the front-rear direction. The inner portions 23b are supported by the transverse frames 22 inside the outer portions 23a (adjacent to the center portion in the transverse direction). The longitudinal direction of each inner portion 23b is set in the front-rear direction.

The plurality of rollers 24 are supported by each support member 23 at predetermined intervals in the front-rear direction. Specifically, the plurality of rollers 24 each are supported by a corresponding pin 24a so as to be rollable with a small torque. Each pin 24a is spanned between the inner portion 23b and outer portion 23a of each support member 23. The top portions (upper end portions) of the respective rollers 24 are located at a level higher than the upper surface of the inner portion 23b.

A plurality of pallets P are mounted on the rollers 24. The intervals between the rollers 24 in the front-rear direction are set so that a pallet P does not drop between the adjacent rollers 24 while the pallet is being transported. When the pallets P are mounted on the rollers 24, the engaging holes P1 and P2 of each pallet P are located inside the inner portions 23b (on the center side in the transverse direction of the inner portions 23b).

As shown in FIG. 2, the thus configured plurality of transport mechanisms 20 are coupled in series via bolts or the like, to form a transport path of pallets P. The plurality of pallets P are arranged on the transport mechanisms 20 so as to be adjacent to each other along the front-rear direction. That is, the plurality of pallets P are closely placed on the transport path.

The pair of drive mechanisms 30R and 30L each push pallets P to transport the pallets P. As shown in FIG. 1 and FIG. 2, the pair of drive mechanisms 30R and 30L each are supported inside the transport mechanism 20 that is located at the upstream-side end portion in the transport direction. The pair of drive mechanisms 30R and 30L each include a longitudinal frame 31, a bracket 34, an actuator 36, the anti-back pawl 37, etc. Note that the right-side drive mechanism 30R shares the longitudinal frame 31 as a common component with the left-side drive mechanism 30L, and the right-side drive mechanism 30R and the left-side drive mechanism 30L are symmetrically formed with respect to the center portion of the longitudinal frame 31 in the transverse direction. For this reason, only the right-side drive mechanism 30R will be described.

As shown in FIG. 3 and FIG. 4, the longitudinal frame 31 is a plate-like member that is supported on the transverse frame 22 at a substantially center portion of the transverse frame 22 located at the front-rear middle portion so that the plate surfaces are oriented in the transverse direction. A rail 32 is attached to the right side surface of the longitudinal frame 31 along the front-rear direction.

A guide member 33 that is slidable over the rail 32 is provided for the rail 32. The bracket 34 is attached to the right end surface of the guide member 33.

A coupling member 35 is attached to the front lower end portion of the right side surface of the bracket 34. The anti-back pawl 37 is attached to the upper end portion of the right side surface of the bracket 34.

A rod 36a of the actuator 36 is connected to the coupling member 35. That is, the bracket 34 is coupled to the actuator 36 via the coupling member 35.

The actuator 36 converts the rotational motion of a motor to linear motion by a ball screw to extend or retract the rod 36a by the converted linear motion. The actuator 36 is supported by the transverse frame 22 located at the front-rear middle portion. An existing electric cylinder is used as the actuator 36.

The rod 36a is retractable in the front-rear direction. That is, the rod 36a reciprocates in the transport direction. The coupling member 35 is connected to the rear end portion of the rod 36a so as to be immovable relative to each other. The reach of the rod 36a (stroke of the actuator 36) according to the present embodiment is slightly greater than the pitch D1 (see FIG. 8B) between the engaging holes P1 and P2 of one pallet P.

The anti-back pawl 37 is used to push pallets P. The anti-back pawl 37 has a coupling portion 37a and an engaging portion 37b.

The coupling portion 37a is connected to the bracket 34 so as to be immovable relative to each other. Thus, the anti-back pawl 37 reciprocates along with the rod 36a via the bracket 34. A predetermined gap is formed between the coupling portion 37a and the pallet P located above the coupling portion 37a.

The engaging portion 37b is a portion that projects upward from the coupling portion 37a, and is a member having a substantially triangular shape in side view so as to gradually rise toward the front side. The length of each engaging portion 37b in the front-rear direction and the length of each engaging portion 37b in the transverse direction are respectively smaller than the length of each of the engaging holes P1 and P2 in the front-rear direction and the length of each of the engaging holes P1 and P2 in the transverse direction. The position of each engaging portion 37b in the transverse direction corresponds to the position of the corresponding engaging hole P1 or P2 in the transverse direction. That is, the engaging holes P1 and P2 of each pallet P move above the corresponding engaging portions 37b. As shown in FIG. 3, the front end surface of the engaging portion 37b in a state where the engaging portion 37b projects upward is formed in a substantially vertical surface, and the upper surface of the engaging portion 37b is formed in an inclined surface that declines from the front end side toward the rear end side.

The engaging portion 37b is constantly urged upward by a spring, and projection of the engaging portion 37b is limited by a stopper so as not to project upward beyond the state shown in FIG. 3. That is, when the engaging hole P1 of a pallet P moves to above the corresponding engaging portion 37b, for example, the engaging portion 37b is urged upward by the spring, and is arranged inside the front engaging hole P1.

When the engaging portion 37b is pressed downward by a force larger than the urging force of the spring, the lower end portion of the engaging portion 37b is retracted into the coupling portion 37a until the top portion (front upper end portion) of the engaging portion 37b is at least placed at the same level as the top portion of each roller 24.

The thus configured anti-back pawl 37 is coupled to the rod 36a of the actuator 36 via the bracket 34 and the coupling member 35 so as to be immovable relative to each other.

As shown in FIG. 2, the pair of drive mechanisms 30R and 30L each are controlled by a control panel 40 that is arranged near the drive mechanisms 30R and 30L.

The control panel 40 is electrically connected to the actuators 36 via power lines 41, and is able to adjust the operations of the actuators 36 (the length of stroke, the timing of extending or retracting the rod, for example).

Figure 5:
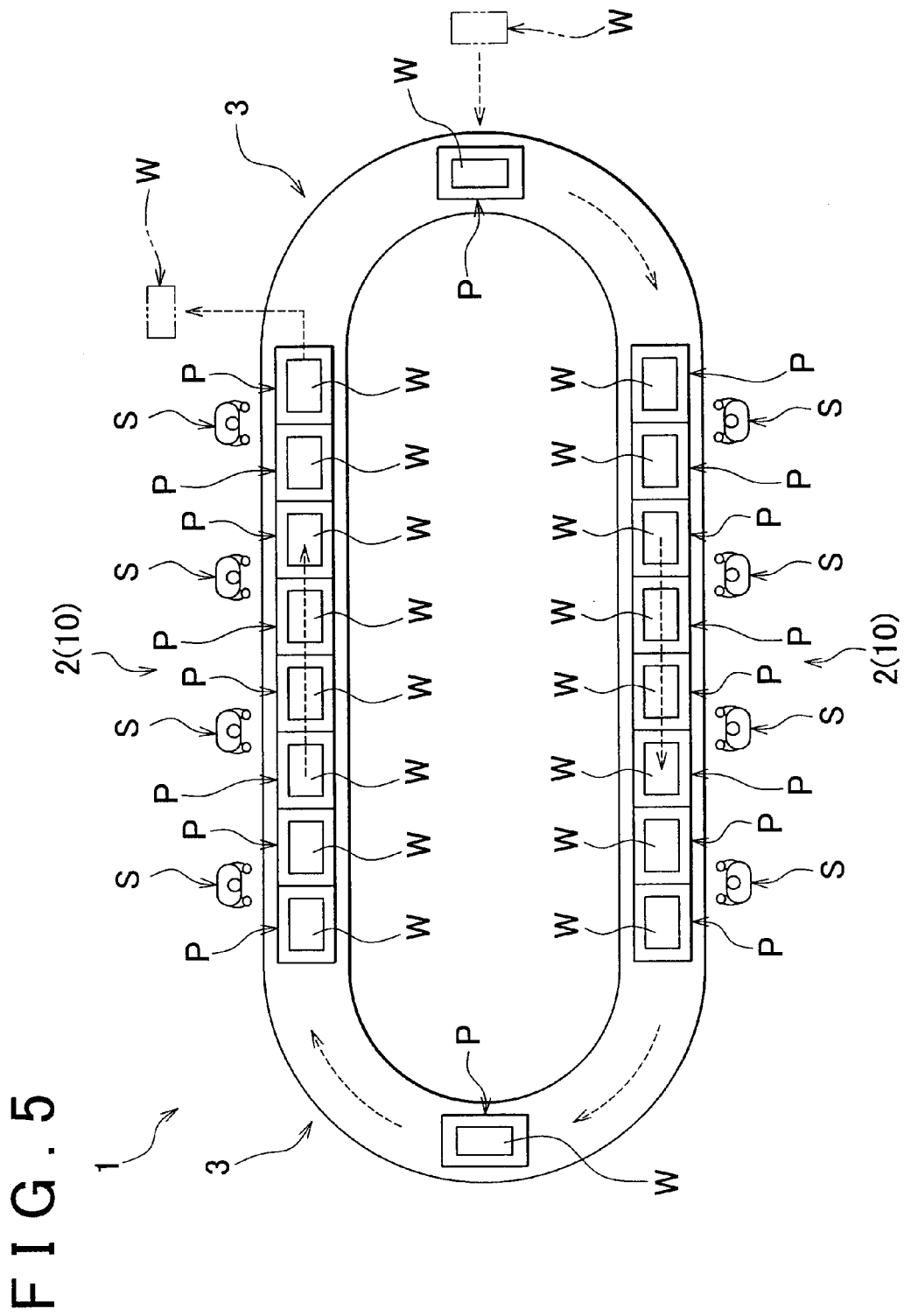
FIG. 5 is a plan view that shows an assembly line.

For example, as shown in FIG. 5, the thus configured conveyor system 10 is installed in the assembly line 1 of a work piece W (for example, engine, or the like).

In the assembly line 1, pallets P are transported in the clockwise direction in FIG. 5, and the pallets P are circulated. The assembly line 1 has two straight portions 2 and two curved portions 3.

At the two straight portions 2, a plurality of workers S located outside the straight portions 2 do predetermined assembling work, and parts are attached to work pieces W respectively mounted on the pallets P. The pallets P are closely placed on each of the two straight portions 2. The above two straight portions 2 each include the conveyor system 10 according to the present embodiment.

In this case, the length of a set of the transport mechanisms 20 and the number of coupled transport mechanisms 20 are adjusted so as to match the length of each straight portion 2 of the assembly line 1, and the plurality of transport mechanisms 20 are coupled in series via bolts or the like (see FIG. 2).

The two curved portions 3 each are a substantially semicircular pallet transport path in plan view. Both end portions of each curved portion 3 are respectively connected to one end portions of the straight portions 2. The above two curved portions 3 each include, for example, a predetermined transport mechanism in which a plurality of rollers that gradually increase in diameter toward the outer side are arranged at predetermined intervals so that the axial direction of each roller coincides with the radial direction of the curved portion 3.

In the assembly line 1, for example, a work piece W is transferred to a pallet P in the middle portion of the right-side curved portion 3 in FIG. 5, and then assembling work is done at the straight portions 2. Then, the work piece W on which assembling work has been done is carried out at the end portion of the upper-side straight portion 2 in FIG. 5.

Figure 6A:
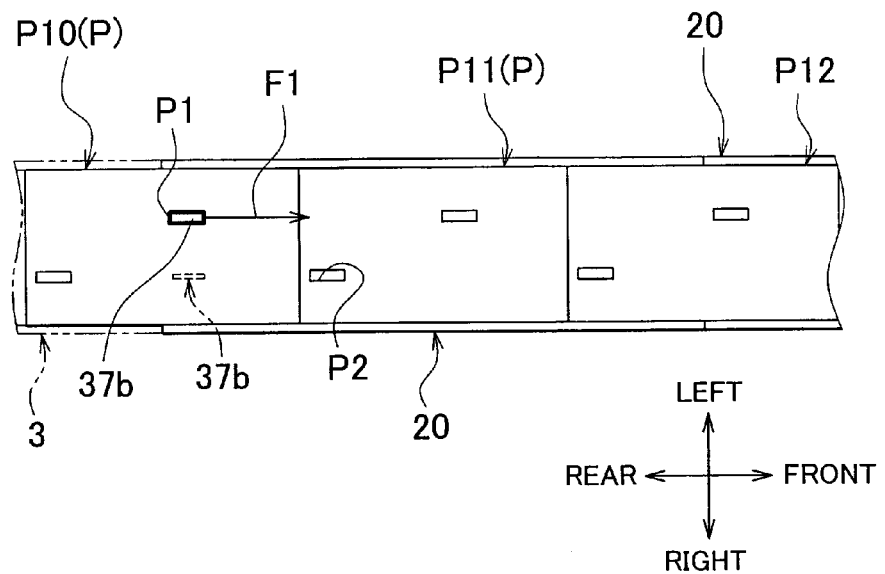
FIG. 6A is a plan view that shows a state where the left-side drive mechanism transports pallets and shows a state where the left-side drive mechanism starts pressing the pallets.

Next, the operation of the conveyor system 10 will be described. Note that, for the sake of convenience of description, the conveyor system 10 is installed in the assembly line 1 shown in FIG. 5 to transport pallets P, transported from the curved portion 3, at a constant speed. In addition, it is assumed that the rod 36a of the actuator 36 of each of the drive mechanisms 30R and 30L shown in FIG. 6A is fully extended. That is, the engaging portion 37b of each anti-back pawl 37 in FIG. 6A is located at the upstream-side end portion in the transport direction. While, in FIG. 6A to FIG. 7B, work pieces W are not shown, actually, work pieces W are respectively mounted on the upper surfaces of the pallets P.

First, a pallet P10 is transported from the curved portion 3 to the upstream-side end portion of the straight portion 2 in the transport direction (that is, the transport mechanism 20 located at the upstream-side end portion of the conveyor system 10 in the transport direction).

At this time, the front engaging hole P1 of the pallet P10 is positioned over the engaging portion 37b of the left-side drive mechanism 30L (hereinafter, simply referred to as "left-side engaging portion 37b"). Thus, the left-side engaging portion 37b projects upward through the front engaging hole P1 and is arranged inside the front engaging hole P1 (see FIG. 3).

On the other hand, the lower surface of the pallet P10 contacts the upper side of the engaging portion 37b of the right-side drive mechanism 30R (hereinafter, simply referred to as "right-side engaging portion 37b"). Thus, the right-side engaging portion 37b tries to project upward due to the spring; however, the right-side engaging portion 37b contacts the lower surface of the pallet P10. Thus, the right-side engaging portion 37b is partially retracted into the coupling portion 37a so that the top portion of the right-side engaging portion 37b is located at the same level as the level of the rollers 24.

After the pallet P10 is transported from the curved portion 3 to the transport mechanism 20, the control panel 40 controls the rod 36a of the left-side drive mechanism 30L to be retracted to thereby move the left-side engaging portion 37b toward the downstream side (front side) in the transport direction (see the arrow F1 in FIG. 6A). At this time, the front end surface of the left-side engaging portion 37b contacts the front side surface of the front engaging hole P1 of the pallet P10 (see FIG. 3). In this case, the front end surface of the left-side engaging portion 37b is formed in a substantially vertical surface, so no downward force is applied to the left-side engaging portion 37b. That is, the left-side engaging portion 37b pushes the pallet P10 toward the downstream side in the transport direction in a state where the left-side engaging portion 37b is engaged with the front engaging hole P1 of the pallet P10 located at the upstream-side end portion in the transport direction.

In this way, when the left-side engaging portion 37b (antiback pawl 37) moves toward the downstream side in the transport direction, the left-side engaging portion 37b engages with the front engaging hole P1 of the pallet P10 and moves together with the pallet P10 toward the downstream side in the transport direction to thereby push the pallet P10.

Figure 6B:
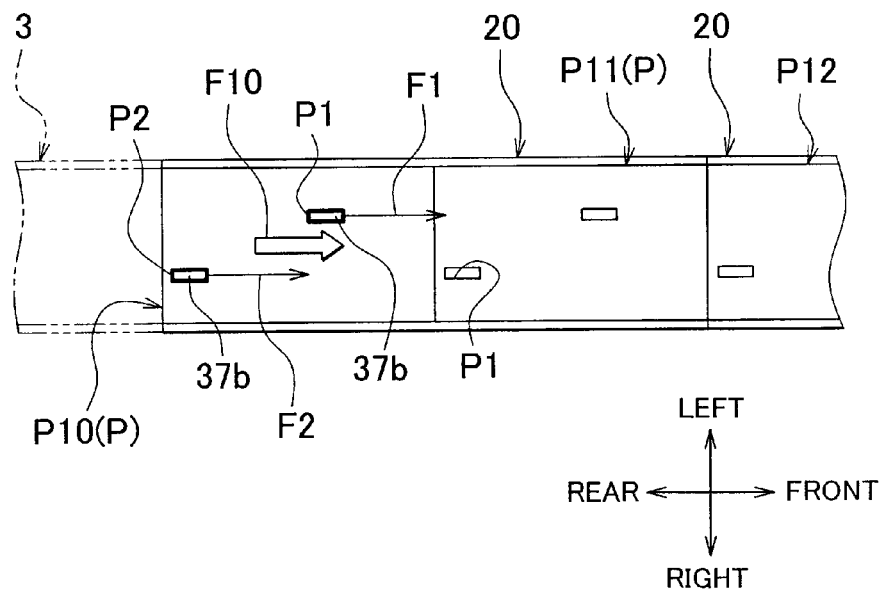
FIG. 6B is a plan view that shows a state where the left-side drive mechanism transports pallets and shows a state where the left-side drive mechanism and the right-side drive mechanism overlappingly push the pallets.

The pallets P10, P11, ... are closely placed on the transport mechanisms 20. Therefore, as shown in FIG. 6A and FIG. 6B, when the pallet P10 is pushed, the pallets P11, P12, ... located downstream of the pallet P10 in the transport direction are also pushed (see the arrow F10 in FIG. 6B). Thus, the left-side drive mechanism 30L simultaneously pushes all the pallets P10, P11, ... that are closely placed on the conveyor system 10.

When the pallet P10 is pushed by the left-side drive mechanism 30L, the operation of the right-side drive mechanism 30R is stopped. At this time, the right-side engaging portion 37b urged upward contacts the lower surface of the pallet P10 pushed by the left-side drive mechanism 30L, so the right-side engaging portion 37b cannot further project upward.

As shown in FIG. 6B, when the rod 36a of the left-side drive mechanism 30L retracts to a certain degree (in the present embodiment, when the rod 36a retracts by the pitch D1 between the engaging holes P1 and P2 of one pallet P shown in FIG. 8B), the rear engaging hole P2 of the pallet P10 is positioned over the right-side engaging portion 37b. At this time, the right-side engaging portion 37b is released from the state where the right-side engaging portion 37b is in contact with the lower surface of the pallet P10, and projects upward from the coupling portion 37a so as to be arranged inside the rear engaging hole P2.

When the right-side engaging portion 37b is arranged inside the rear engaging hole P2, the rod 36a of the right-side drive mechanism 30R is retracted to move the right-side engaging portion 37b toward the downstream side in the transport direction (see the arrow F2 in FIG. 6B). At this time, the right-side engaging portion 37*b*, as in the case of the left-side engaging portion 37*b*, engages with the rear engaging hole P2, and pushes the pallet P10. In addition, the left-side drive mechanism 30L continues to push the pallet P10 (see the arrow F 1 in FIG. 6B). That is, in FIG. 6B, the drive mechanisms 30R and 30L are used to push the pallet P10.

In this way, each of the drive mechanisms 30R and 30L that serve as driving devices has the engaging portion 37*b* that engages with the pallet P10 that is one of the plurality of pallets P that is located at the upstream-side end portion in the transport direction.

In addition, each pallet P has the engaging holes P1 and P2 that serve as engaged portions that respectively engage with the engaging portions 37*b* of the drive mechanisms 30R and 30L.

After the drive mechanisms 30R and 30L start pushing the pallet P10, when the rod 36*a* of the left-side drive mechanism 30L completes retracting as shown in FIG. 7A, the left-side drive mechanism 30L completes pushing the pallet P10. At this time, the right-side drive mechanism 30R continues to push the pallet P10.

After the left-side drive mechanism 30L completes pushing the pallet P10 (the rod 36*a* of the left-side drive mechanism 30L completes retracting), the rod 36*a* of the left-side drive mechanism 30L is extended to move the left-side engaging portion 37*b* toward the upstream side (rear side) in the transport direction (see the arrow B1 in FIG. 7A). At this time as well, the right-side drive mechanism 30R continues to push the pallet P10 (see the arrows F2 and F10 in FIG. 7A).

In this way, when the rod 36*a* of the left-side drive mechanism 30L starts extending, the left-side engaging portion 37*b* moves toward the upstream side in the transport direction with respect to the front engaging hole P1. However, the upper surface of the left-side engaging portion 37*b* is formed to be an inclined surface that declines from the front end side toward the rear end side. Therefore, the upper surface of the left-side engaging portion 37*b* does not engage with the upstream-side surface of the front engaging hole P1 but is pressed downward by the lower surface of the pallet P10, located upstream of the front engaging hole P1. That is, the left-side engaging portion 37*b* moves toward the upstream side in the transport direction while being retracted into the coupling portion 37*a* until the top portion of the left-side engaging portion 37*b* is located at the same level as the level of the top portion of each roller 24. Then, after the top portion of the left-side engaging portion 37*b* is located at the same level as the level of the top portion of each roller 24, the top portion of the left-side engaging portion 37*b* moves toward the upstream side in the transport direction in a state where the top portion of the left-side engaging portion 37*b* is in contact with the lower surface of the pallet P10.

In this way, when the left-side engaging portion 37*b* (anti-back pawl 37) moves toward the upstream side in the transport direction because of extension of the rod 36*a* of the left-side drive mechanism 30L, the left-side engaging portion 37*b* does not engage with the front engaging hole P1 of the pallet P10 but moves toward the upstream side in the transport direction relative to the pallet P 10.

At this time, as shown in FIG. 7B, a pallet P9 is transported from the curved portion 3 onto the transport mechanism 20 located at the upstream-side end portion in the transport direction. That is, the left-side engaging portion 37*b* moves toward the upstream side in the transport direction in a state where the left-side engaging portion 37*b* is in contact with the lower surface of the pallet P9 or P10.

When the left-side engaging portion 37*b* moves to the position, at which the left-side engaging portion 37*b* was positioned before the left-side engaging portion 37*b* starts pushing the pallet P10 (the position of the engaging portion 37*b* shown in FIG. 6A), the rod 36*a* of the left-side drive mechanism 30L completes extending.

After the rod 36*a* of the left-side drive mechanism 30L completes extending, the rod 36*a* of the right-side drive mechanism 30R retracts to a certain degree (in the present embodiment, by the pitch D2 between the engaging holes P1 and P2 of the adjacent pallets P shown in FIG. 8B), and the front engaging hole P1 of the pallet P9 is located over the left-side engaging portion 37*b*. Thus, the left-side engaging portion 37*b* is arranged inside the front engaging hole P1 of the pallet P9.

Here, the left-side engaging portion 37*b* is arranged inside the front engaging hole P1 of the pallet P9 after the left-side engaging portion 37*b* is arranged inside the front engaging hole P1 of the pallet P10 at the start of transport. That is, at this point in time, the transport mechanisms 30R and 30L have transported one pallet.

When the engaging portion 37*b* is arranged inside the front engaging hole P1 of the pallet P9, the left-side drive mechanism 30L starts pushing the pallet P9 (see the arrow F1 in FIG. 7B). At this time, the right-side drive mechanism 30R continues to push the pallet P10 (see the arrows F2 and F10 in FIG. 7B).

Then, after the rod 36*a* of the right-side drive mechanism 3OR completes retracting, the rod 36*a* of the right-side drive mechanism 30R is extended. The engaging portion 37*b* engages with the rear engaging hole P2 of the pallet P9 and then the right-side drive mechanism 30R starts pushing the pallet P9 by the time when the left-side drive mechanism 30L completes pushing the pallet P9. The conveyor system 10 repeats the above pushing operation using the drive mechanisms 30R and 30L.

In this way, in the conveyor system 10, by the time when any one of the drive mechanisms 30R and 30L completes pushing the pallet P, the engaging portion 37*b* of the other of the drive mechanisms 30R and 30L is engaged with the front engaging hole P1 (or the rear engaging hole P2) of the pallet P and then the other drive mechanism starts pushing the pallet P, whereby the pallet P is transported. That is, the conveyor system 10 constantly transports pallets P at a constant speed by alternately overlapping pushing operations performed by the respective drive mechanisms 30R and 30L.

Here, it is required of the actuator 36 of each of the drive mechanisms 30R and 30L to push a pallet P at the upstream-side end portion in the transport direction with a force that can transport all the pallets P at a constant speed.

The pallets P are mounted on the rollers 24 of the transport mechanisms 20. The rollers 24 roll with a small torque. Therefore, the pallets P are movable in the transport direction with a small force. In addition, the weight of transported products (the weight of pallets P and work pieces W) is not exerted on the drive mechanism 30R or 30L.

Therefore, the actuator 36 of each of the drive mechanisms 30R and 30L is able to push all the pallets P by pushing the pallet P located at the upstream-side end portion in the transport direction with a small force.

In this way, the transport mechanisms 20 that serve as transport portions are able to transport pallets P, pushed by the drive mechanisms 30R and 30L, at a constant speed.

Figure 9A:
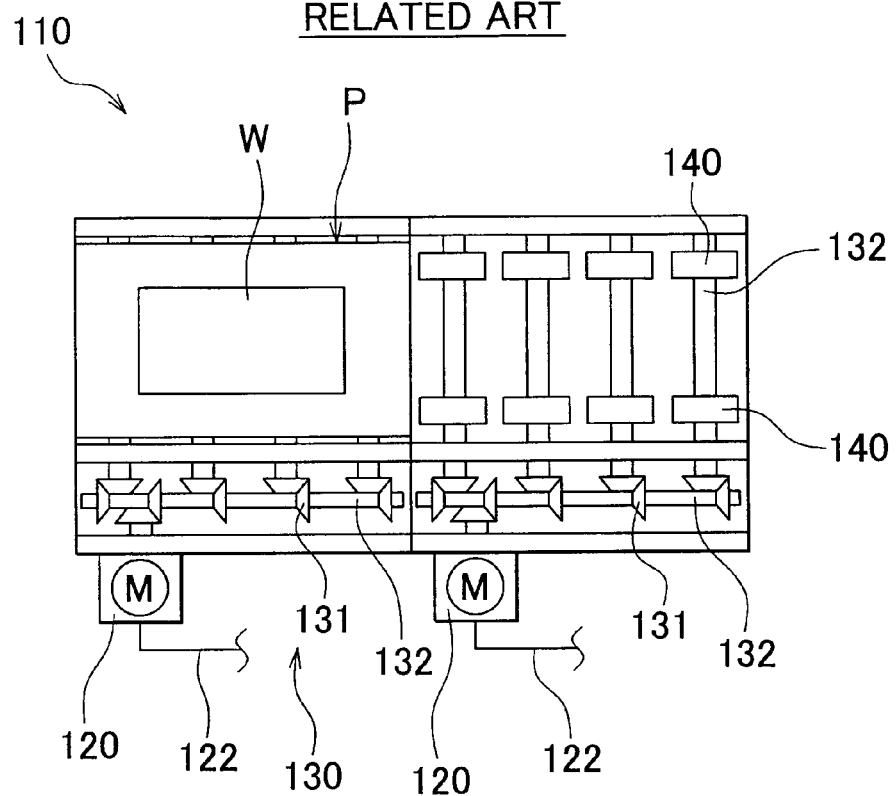
FIG. 9A is a plan view that shows an internal configuration of an existing conveyor system.
Figure 9B:
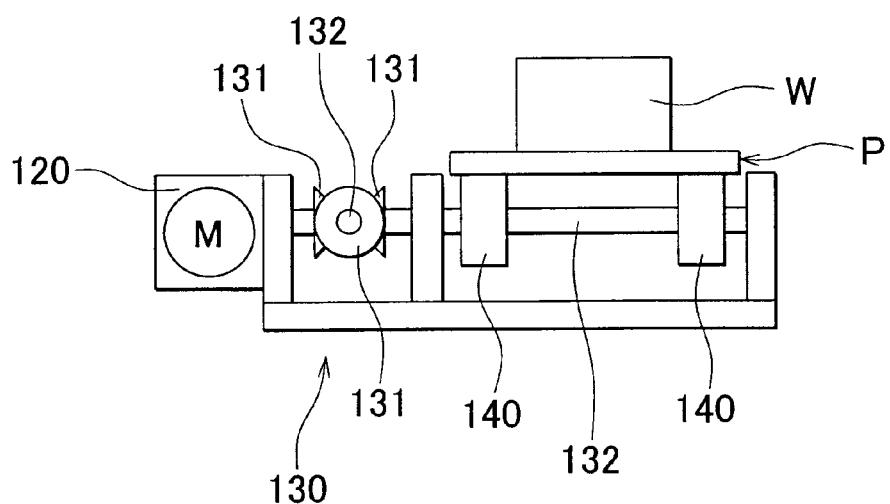
FIG. 9B is a front view that shows the internal configuration of the existing conveyor system.

On the other hand, as shown in FIG. 9A and FIG. 9B, when the power of each motor 120 is transmitted by the drive transmitting portion 130 as in the case of the related art, a power loss occurs in transmission of power. Therefore, a large amount of power is lost before the power is transmitted to the rollers 140. Thus, a high-power motor that is employed in consideration of the power loss, machined components for reducing loss, etc. are required.

That is, with the conveyor system 10 according to the present embodiment, the power of each actuator 36 is transmitted to the pallets P without any loss. Therefore, a high-power motor (actuator) that is employed in consideration of the power loss, machined components for reducing loss, etc. are not required, so that it is possible to reduce the weight and cost of the conveyor system 10.

The conveyor system 10 is configured so that the transport mechanisms 20 having a relatively light weight are just coupled in series except the transport mechanism 20 that is located at the upstream-side end portion in the transport direction and to which the drive mechanisms 30R and 30L are attached. Thus, the weight of the conveyor system 10 is lighter than the weight of the conveyor system 110 according to the related art in which the motors 120, the drive transmitting portions 130, and the like, are arranged all along the conveyor (see FIG. 9A and FIG. 9B).

Therefore, in installation work, it is not necessary to conduct large-scale work using heavy equipment. That is, it is possible to easily conduct installation work.

Figure 10:
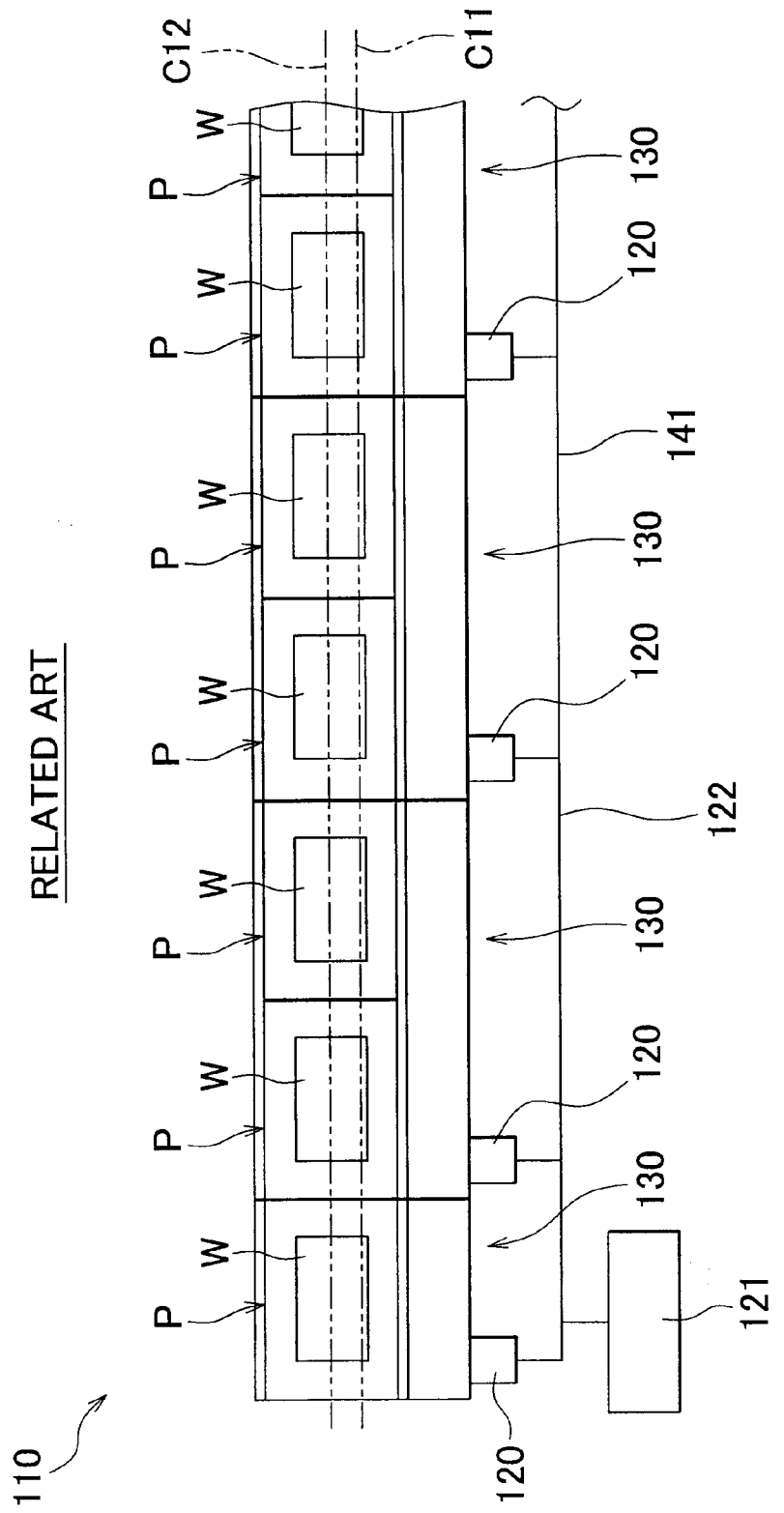
FIG. 10 is a plan view that shows an external configuration of the existing conveyor system.

In addition, as shown in FIG. 10, the conveyor system 110 according to the related art is configured so that the drive transmitting portions 130, each of which transmits the power of the motor 120, are attached to one side portion of the conveyor system 110. In this case, the drive transmitting portions 130 project from one side of the conveyor system 110, so that the center line C11 of the conveyor system 110 in the transverse direction differs in position from the center line C12 of pallets P in the transverse direction. That is, the conveyor system 110 is transversely asymmetric.

Thus, when workers do work on the right or left side of the conveyor system 110, the drive transmitting portions 130 are arranged between the workers and work pieces W, so the workers have to do work in a posture such that the drive transmitting portions 130 are avoided. That is, it is hard to get close to work pieces W, so the posture of the workers is restricted. This deteriorates the working efficiency and the working condition.

On the other hand, as shown in FIG. 2, the conveyor system 10 according to the present embodiment is configured to push the pallet P located at the upstream-side end portion in the transport direction by the drive mechanism 30R or 30L, so that no drive transmitting portion 130 is required. In addition, the pair of drive mechanisms 30R and 30L each are supported inside the transport mechanism 20 located at the upstream-side end portion in the transport direction, so that the components of the drive mechanisms 30R and 30L do not project outside of the conveyor system 10. Therefore, the center line C1 of the conveyor system 10 in the transverse direction coincides with the center line C2 of pallets P in the transverse direction (transversely symmetrical).

Thus, even when workers do work from any one of both right and left sides of the conveyor system 10, the workers are able to do work in a state where the workers are close to work pieces W. That is, the workers easily get close to work pieces W and are able to do work without any restrictions on their posture, so that it is possible to prevent deterioration in the working efficiency and the working condition. Furthermore, no drive transmitting portion is required, so that space saving is achieved.

In addition, as shown in FIG. 10, when the conveyor system 110 according to the related art is extended or shortened, it is necessary to conduct work for wiring the long power lines 122 over the entire conveyor, work for adjusting the drive transmitting portions 130, and the like. That is, the term of work required to change the length of the conveyor system 110 increases.

On the other hand, as shown in FIG. 2, in the conveyor system 10 according to the present embodiment, the length of the conveyor system 10 may be changed by adding or removing the transport mechanism 20. That is, the term of work required to change the length of the conveyor system 10 is remarkably reduced.

In the case of the power lines 41 of the conveyor system 10 according to the present embodiment, it suffices that the actuators 36 of the respective drive mechanisms 30R and 30L are connected to the control panel 40. That is, the driving portions connected to the control panel 40 are located only at the upstream-side end portion in the transport direction, so that the power lines 41 are shortened, and the number of the power lines 41 is reduced. In addition, since the control panel 40 controls only the actuators 36, in comparison with the control panel 121 (see FIG. 10) according to the related art, the conveyor system 10 may be controlled by the small control panel 40.

Another embodiment of the conveyor system 10 according to the present invention may be configured so that the rod 36a of each of the drive mechanisms 30R and 30L is extended to push a pallet P located at the upstream-side end portion in the transport direction. However, in this case, the drive mechanisms 30R and 30L project toward the upstream side in the transport direction from the transport mechanism 20 located at the upstream-side end portion in the transport direction. That is, when a configuration is employed, in which a pallet P is pushed by retracting the rod 36a of the drive mechanism 30R or 30L, it is possible to reduce the size of the conveyor system 10.

Another embodiment of the conveyor system 10 according to the present invention may be configured to transport pallets P by pulling the pallet P located at the downstream-side end portion in the transport direction. However, in this case, it is necessary to couple the pallet P located at the upstream-side end portion of the conveyor system in the transport direction to a newly transported pallet P at the upstream-side end portion of the conveyor system in the transport direction. That is, when a configuration is employed, in which the pallet P located at the upstream-side end portion in the transport direction is pushed as in the case of the present embodiment, it is possible to transport pallets P without using a predetermined coupling mechanism for coupling the pallets P. Thus, it is possible to reduce the cost of the conveyor system 10.

Note that the configuration of each transport mechanism 20 is not limited to the present embodiment. That is, it suffices that each transport mechanism 20 is configured to be able to transport pallets P at a constant speed, and may be, for example, a plate-like member of which the longitudinal direction is set in the front-rear direction and that has a slippery upper surface (having a low friction coefficient) instead of the rollers 24. In addition, each transport mechanism 20 may be an existing free roller conveyor.

The configuration of each actuator 36 is not limited to the present embodiment. That is, each actuator 36 may be, for example, a hydraulic cylinder, or the like. However, in terms of being able to easily adjust the stroke of the rod 36a (that is, the length by which a pallet P is pushed) or the speed at which a pallet P is pushed (that is, the speed at which a pallet P is transported), each actuator 36 is desirably an electric cylinder.

The stokes of the respective actuators 36 have the same length; however, the invention is not limited to this configuration. That is, the strokes of the respective actuators 36 may be different from each other. In this case, the pitch D1 between the engaging holes P1 and P2 of one pallet P and the pitch D2 between the respective engaging holes P1 and P2 of the adjacent pallets P are adapted to the strokes of the respective actuators 36.

In the present embodiment, pallets P are transported by the drive mechanisms 30R and 30L, that is, two drive mechanisms 30R and 30L; however, the invention is not limited to this configuration. That is, pallets P may be transported by three or more drive mechanisms. In this case, each pallet P may have three or more engaging holes.

Each pallet P has the front engaging hole P1 and the rear engaging hole P2; however, the invention is not limited to this configuration. That is, each pallet P may be configured to have cutout portions instead of the engaging holes P1 and P2. Each cutout portion is formed by cutting out the lower surface of each pallet P. In the above configuration, the engaging portion 37b of each of the drive mechanisms 30R and 30L engages with the cutout portion and then the pallet P is pushed. In this case, each cutout portion serves as an engaged portion.

For example, when transport of a pallet P is stopped while the pallet P is being transported at a slightly high speed, the pallet P may deviate from an assumed stop position toward the downstream side in the transport direction. In such a case, each transport mechanism 20 may be provided with a brake.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A conveyor system that transports a plurality of pallets that are closely placed on a transport path, comprising:
    at least two driving devices that each has an engaging portion to be engaged with, of the plurality of pallets, the pallet located at an upstream-side end portion in a pallet transport direction, and that each moves the engaging portion toward a downstream side in the pallet transport direction in a state where the engaging portion is engaged with the pallet located at the upstream-side end portion to thereby simultaneously push the plurality of pallets; and
    a plurality of transport portions on which the plurality of pallets are mounted and that are coupled in series to form the transport path and are able to transport the plurality of pallets pushed by the driving devices,
    wherein the conveyor system is configured to transport the plurality of pallets at a constant speed by repeating engaging the engaging portion of one of the driving devices with the pallet located at the upstream-side end portion in the pallet transport direction and causing the one of the driving devices to start pushing the plurality of pallets by the time when another one of the driving devices completes pushing the plurality of pallets, and
    the conveyor system is configured so that a length of the conveyor system can be changed by adding or removing at least one of the transport portions.

2. The conveyor system according to claim 1, wherein:
    each of the plurality of pallets has an engaged portion that engages with one of the engaging portions of the driving devices;
    each driving device includes an actuator having a rod that extends and retracts along the pallet transport direction; and
    the engaging portion of each driving device includes an anti-back pawl that is coupled to the rod so as to be immovable relative to each other, that engages with the engaged portion of the pallet and moves together with the pallet toward the downstream side in the pallet transport direction when the anti-back pawl moves toward the downstream side in the pallet transport direction, and that moves toward the upstream side in the pallet transport direction relative to the pallet when the anti-back pawl moves toward the upstream side in the pallet transport direction.

3. The conveyor system according to claim 2, wherein each actuator retracts the rod to push the pallets.

4. The conveyor system according to claim 2, wherein
    the engaged portions include a first engaged portion and a second engaged portion, and
    the first engaged portion and the second engaged portion are offset from each other in the pallet transport direction and in a direction perpendicular to the pallet transport direction.

5. The conveyor system according to claim 4, wherein
    the first engaged portions and the second engaged portions are arranged so that, when the plurality of pallets are aligned along the pallet transport direction so that the adjacent pallets are in contact with each other, the first engaged portions are aligned in a straight line at a constant pitch, the second engaged portions are aligned in another straight line at the constant pitch, and the first engaged portions and the second engaged portions are alternately arranged at equal intervals in the pallet transport direction.

6. The conveyor system according to claim 4, wherein the plurality of pallets each have the first engaged portion and the second engaged portion.

7. The conveyor system according to claim 1, wherein the at least two driving devices are arranged below the transport portion and inside the transport portion in a horizontal direction perpendicular to the pallet transport direction.

* * * * *